(12) United States Patent
Martin et al.

(10) Patent No.: US 8,608,103 B2
(45) Date of Patent: Dec. 17, 2013

(54) PERSONAL FLIGHT DEVICE INCORPORATING RADIATOR COOLING PASSAGE

(75) Inventors: Glenn Neil Martin, Christchurch (NZ); Colin Cecil Dodge, Canterbury (NZ); Mark John Daniel, Christchurch (NZ)

(73) Assignee: Martin Aircraft Company Limited (NZ)

( * ) Notice: Subject to any disclaimer, the term of this patent is extended or adjusted under 35 U.S.C. 154(b) by 378 days.

(21) Appl. No.: 13/001,254

(22) PCT Filed: May 13, 2009

(86) PCT No.: PCT/NZ2009/000074
§ 371 (c)(1),
(2), (4) Date: Jan. 27, 2011

(87) PCT Pub. No.: WO2009/157780
PCT Pub. Date: Dec. 30, 2009

(65) Prior Publication Data
US 2011/0139939 A1    Jun. 16, 2011

(30) Foreign Application Priority Data
Jun. 27, 2008 (NZ) .................................... 569455

(51) Int. Cl.
*B64C 39/02* (2006.01)
*B64C 29/00* (2006.01)
*F01P 1/00* (2006.01)

(52) U.S. Cl.
USPC .......................................................... 244/4 A

(58) Field of Classification Search
USPC ............................ 244/2, 23 R, 23 A, 4 A, 903
See application file for complete search history.

(56) References Cited

U.S. PATENT DOCUMENTS

| | | | |
|---|---|---|---|
| 2,417,896 | A | 3/1947 | Zimmerman |
| 2,461,347 | A | 2/1949 | Pentecost |

(Continued)

FOREIGN PATENT DOCUMENTS

| | | |
|---|---|---|
| CN | 1114831 A | 1/1996 |
| CN | 101132966 A | 2/2008 |

(Continued)

OTHER PUBLICATIONS

International Search Report, dated Sep. 2, 2009, corresponding to PCT/NZ2009/000074, 2 pages.

(Continued)

*Primary Examiner* — Joseph W Sanderson
(74) *Attorney, Agent, or Firm* — Christie, Parker & Hale, LLP

(57) ABSTRACT

A personal flight device which includes a housing which is securable to a pilot having at least one pair of ducted fans, one fan of the at least one pair of ducted fans is mounted to one side of the housing, the other fan of the at least one pair of ducted fans mounted to the other side of the housing. Each fan rotates about an axis of rotation so as to draw air through the corresponding duct from an entry end of the duct to an exit end of the duct. At least one radiator is also provided. Each engine of the at least one engine is cooled by a radiator of the at least one radiator. Each radiator of the at least one radiator is associated with at least one passage having an entry end in communication with one surface of the radiator and an exit end adjacent the entry end of one duct of the ducted fans.

16 Claims, 10 Drawing Sheets

(56) References Cited

U.S. PATENT DOCUMENTS

| | | | |
|---|---|---|---|
| 2,955,780 A | 10/1960 | Hulbert | |
| 3,023,980 A | 3/1962 | Martin et al. | |
| 3,063,655 A | 11/1962 | Skavinsky | |
| 3,149,799 A | 9/1964 | Hulbert | |
| 3,173,629 A | 3/1965 | Uhor | |
| 3,184,183 A | 5/1965 | Piasecki | |
| 3,265,329 A | 8/1966 | Postelson | |
| 3,474,987 A | 10/1969 | Meditz | |
| 3,494,575 A | 2/1970 | Budworth | |
| 3,556,438 A | 1/1971 | Meditz | |
| 3,994,453 A | 11/1976 | Firestone | |
| 4,272,041 A | 6/1981 | Mabuchi et al. | |
| 4,379,532 A | 4/1983 | Dmitrowsky | |
| 4,575,341 A | 3/1986 | Bryant et al. | |
| 5,505,407 A | 4/1996 | Chiappetta | |
| 5,779,188 A | 7/1998 | Frick | |
| 6,293,492 B1 | 9/2001 | Yanagisawa | |
| 6,353,789 B1 | 3/2002 | Hanson | |
| 6,464,166 B1 | 10/2002 | Yoeli | |
| 6,488,232 B2 | 12/2002 | Moshier | |
| 6,488,504 B1 | 12/2002 | Patterson | |
| 6,575,402 B1 | 6/2003 | Scott | |
| 6,708,920 B2 | 3/2004 | Fukuyama | |
| 6,817,570 B2 | 11/2004 | Yoeli | |
| 6,824,095 B2 | 11/2004 | Mao | |
| 6,848,649 B2 | 2/2005 | Churchman | |
| 6,854,686 B2 | 2/2005 | Perlo et al. | |
| 7,188,803 B2 | 3/2007 | Ishiba | |
| 7,484,687 B2 * | 2/2009 | Martin | 244/4 A |
| 2002/0104919 A1 | 8/2002 | Geranio et al. | |
| 2002/0104921 A1 | 8/2002 | Louvel | |
| 2002/0113165 A1 | 8/2002 | Moshier | |
| 2005/0178879 A1 | 8/2005 | Mao | |
| 2006/0057544 A1 | 3/2006 | Bond | |
| 2006/0196991 A1 | 9/2006 | Martin | |
| 2011/0133037 A1 * | 6/2011 | Martin et al. | 244/4 A |
| 2011/0139939 A1 * | 6/2011 | Martin et al. | 244/23 A |

FOREIGN PATENT DOCUMENTS

| | | |
|---|---|---|
| DE | 2021043 | 11/1971 |
| DE | 2552888 | 6/1977 |
| DE | 4302791 | 8/1994 |
| FR | 2667568 | 4/1992 |
| GB | 268279 | 7/1926 |
| GB | 900095 | 7/1962 |
| RU | 2135393 C | 8/1999 |
| WO | WO 95/08472 | 3/1995 |
| WO | WO 00/35751 A | 6/2000 |
| WO | WO 02/47978 A2 | 6/2002 |
| WO | WO 2006/093420 A1 | 9/2006 |

OTHER PUBLICATIONS

Office action issued from the Australian Government, IP Australia dated Sep. 7, 2012, for AU Application No. 2009263090; 3 pages.

Office action issued from the State Intellectual Property Office of China dated Nov. 5, 2012, for CN Application No. 200980124427.X; 13 pages.

Office Action issued from the Canadian Intellectual Property Office dated Dec. 3, 2012, for CA Application No. 2,731,205; 2 pages.

Office action issued from the Eurasian Patent Office dated Dec. 11, 2012 for EA Application No. 201100117/31; 3 pages.

PCT International Search Report dated Apr. 11, 2006 for PCT Application PCT/NZ2006/000029.

International Preliminary Report on Patentability, dated May 3, 2010, issued in PCT/NZ2009/000075, 9 pages.

International Search Report, dated Aug. 19, 2009, issued in PCT/NZ2009/000075, 4 pages.

Pike, John, H-21 Shawnee, Global Security.org, Aug. 15, 2004, http://web.archive.org/web/20040815133402/http://www.globalsecurity.org/military/systems/aircraft/h-21.htm, 2 pages.

Van Aken, Scott, Fonderie Miniature, 1/48 Piasecki H-21, Aug. 4, 2004, Modelingmadness.com, http://web.archive.org/web/20040804093536/http://www.modelingmadness.com/scotts/korean/fmh21preview.htm, 3 pages.

US Army, Shawnees Over South Vietnam 1962, 1962, Available at Wikipedia.org., http//upload.wikimedia.org/wikipedia/en/0/03/Shawnees_over_south_vietnam_1962.gif, 1 page.

Ch-47 Chinook, Wikipedia, edited Oct. 13, 2004, http://en.wikipedia.org/w/index.php?title=CH-47_Chinook &oldid=7080365, 3 pages.

Roddenberry, Gene; USS Enterprise NCC-1701-D captain's chair, Star Trek: The Next Generation, aired 1987-1994, Paramount Television, Image available at Star Trek Wiki, http://memory-alpha.org/en/wiki/image:enterprisedcommandchair.jpg, 1 page.

* cited by examiner

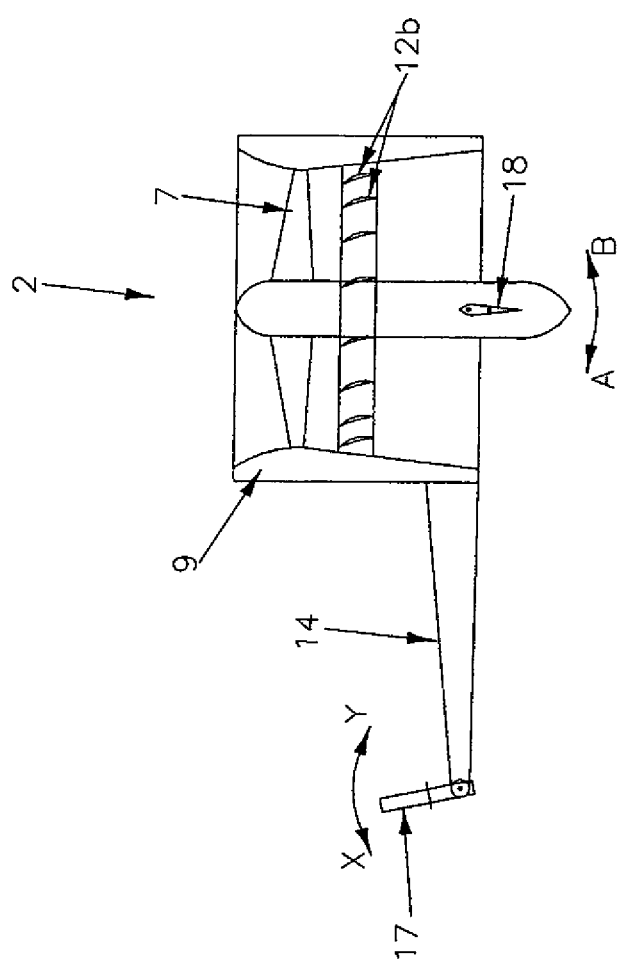

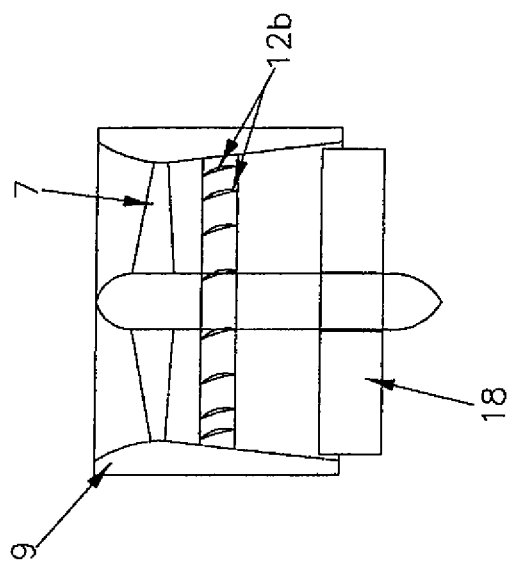
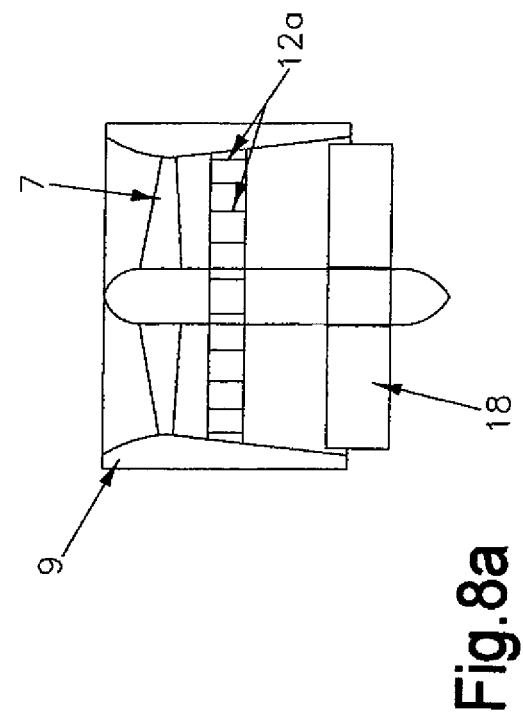

PERSONAL FLIGHT DEVICE INCORPORATING RADIATOR COOLING PASSAGE

CROSS-REFERENCE TO RELATED APPLICATION

This application is a National Phase Patent Application and claims the priority of International Application Number PCT/NZ2009/000074, filed on May 13, 2009, which claims priority of New Zealand Patent Application Number 569455, filed on Jun. 27, 2008.

FIELD OF THE INVENTION

The present invention relates to a vertical take-off and landing personal flight device, i.e. a device which can be secured to the pilot rather like a jet belt, and which gives the pilot controllable powered flight.

BACKGROUND OF THE INVENTION

It should be noted that any discussion of the prior art throughout the specification is not an admission that such prior art is widely known or forms part of the common general knowledge in the field.

Personal flight devices were developed in the 1960s and 1970s, but were essentially rocket based devices (jet belts) which gave extremely short flight times (typically about 26 seconds) and were difficult to control. Further, these devices were fuelled by rocket fuel which is intrinsically dangerous.

In a related type of device fuel is fed to a catalyst bed to produce hot gas which is distributed between two spaced counter-rotating turbines to generate vertical thrust from the turbine exhausts. The device is steered by shrouds or deflector rings pivoted to the base of each turbine.

More recently, a number of personal flight devices have been proposed which use ducted fans as their means of propulsion:—for example a device which includes a pair of ducted fans and which is steered by tilting the ducted fans relative to the pilot.

A broadly similar type of design has been proposed, using shrouded propellers rather than ducted fans.

As the terms are used in this specification, the distinction between a 'shrouded propeller' and a 'ducted fan' essentially is that a ducted fan comprises one or more rotating aerofoils or fans (single or multi-bladed) mounted completely within a duct; the duct increases the overall efficiency of the fan. A shrouded propeller comprises a rotating aerofoil or propeller which is surrounded by a shroud, the only function of the shroud being to protect the propeller—the shroud does not appreciably affect the efficiency of the propeller.

A further proposal describes a device which includes a pair of ducted fans. In this device, the fans are rigidly secured to the supporting harness, and steering is achieved by control flaps mounted adjacent to the outlet of each fan. However, in this design the two fans are contra-rotating and thus have to be driven via a gearbox using a relatively complex rigid transmission system; this adds considerable weight to the device.

Other prior art proposals have been for single shrouded propellers or ducted fans. Single propeller/fan devices have the drawback that the propeller/fan has to be extremely large to provide adequate lift, and to balance the devices the pilot generally has the propeller/fan above or below him, which is far from ideal from a safety point of view. A further drawback is that the thrust from a single propeller/fan has to be split in some way to give steering and this tends to result in high frictional losses in the steering tubes or ducts.

SUMMARY OF INVENTION

An object of the present invention is a personal flight device which overcomes the disadvantages of the prior art devices described above, and which provides a lightweight yet powerful personal flight device which is comparatively safe to use.

The present invention provides a personal flight device which includes:—
- a housing which is securable to a pilot;
- at least one pair of ducted fans, one fan of the pair mounted to one side of the housing, the other fan of the pair mounted to the other side of the housing; wherein each fan rotates about an axis of rotation so as to draw air through the corresponding duct from an entry end of the duct to an exit end of the duct; and wherein the axis of rotation of each fan is fixed relative to the housing;
- at least one engine mounted on the housing for driving the fans such that both fans rotate in the same direction for producing thrust;
- the or each engine being cooled by a radiator;
- the or each radiator being associated with at least one passage having an entry end in communication with one surface of the radiator and an exit end adjacent the entry end of one of said ducts.

It is envisaged that the device probably would use only a single engine and a single pair of fans, since it is important for most applications to keep the overall weight of the device as low as possible. However, it would be possible to use more than one pair of fans, each pair driven by its own engine or both/all pairs driven by a single engine.

Preferably, the housing is securable to a pilot by means of a harness, and includes protective shielding between the pilot and the engine and fans.

The engine may be any suitable reliable, robust, lightweight engine e.g. a two-stroke or a four-stroke internal combustion engine, rotary engine, or a gas turbine.

The drive means may be any reliable lightweight drive means e.g. a chain drive, a fluid drive or a belt drive. Preferably, the drive means is a flexible belt drive, most preferably a toothed belt drive or a micro-V belt drive. A belt drive is preferred because a belt drive may easily be inspected by a pilot to check for wear or damage, and modern belt drives give a low-weight high-efficiency drive. For additional security, two or more drive means may be used in parallel.

Preferably, the device also includes steering means, which may be any suitable means, e.g. a steering vane on one or more fans; a moveable steering shroud around the lower end of one or more fans; or steering jets. Preferably, the steering means includes a steering vane on each fan, arranged to direct the airflow leaving the fan in use, and controllable by the pilot. Most preferably, the steering means comprise those described in the co-pending New Zealand application. No. 569454 and co-pending U.S. patent application Ser. No. 13/001,319.

BRIEF DESCRIPTION OF THE DRAWINGS

By way of example only, a preferred embodiment of the present invention is described in detail with reference to the accompanying drawings in which:—

FIG. 7 is a diagram of part of the control system;

FIGS. 8a and b are diagrams of two different versions of stators;

DETAILED DESCRIPTION OF THE INVENTION

Figure 1:
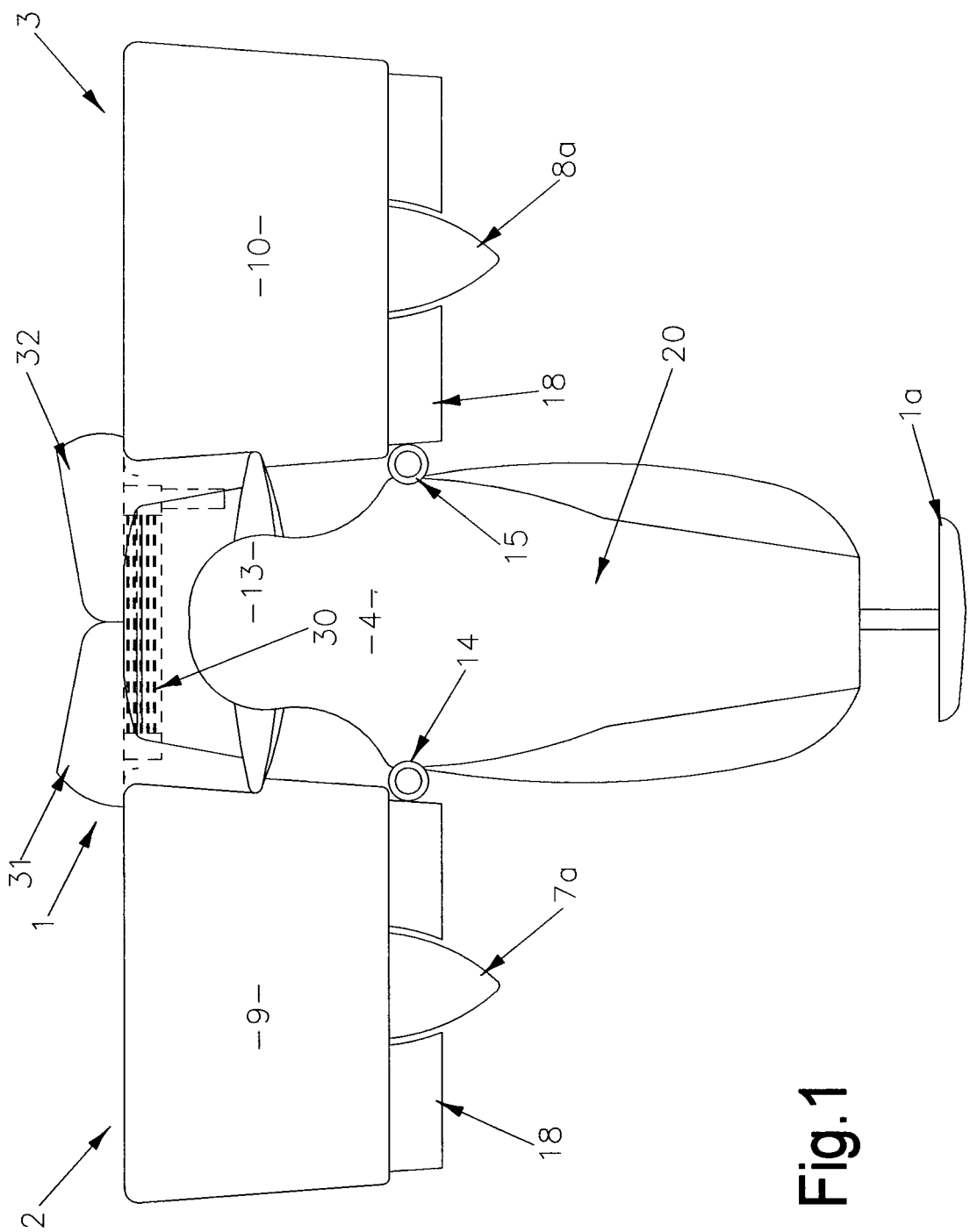
FIG. 1 is a diagrammatic front view of a device in accordance with the present invention.

Referring to the drawings, a personal flight device 1 includes a pair of ducted fans 2,3 which are supported and spaced apart by a central housing 4, which also supports an engine 6 and a fuel tank (not visible).

The ducted fans 2,3 are of known design and consist of a central multi-blade fan 7,8 mounted on, and rotatable with, a hub 7a,8a, inside a concentric cylindrical duct 9,10. The ducts 9,10 are rigidly mounted on the housing 4 by mounting brackets 4a (visible in FIG. 2 only) and are oriented such that in the "at rest" position shown in FIGS. 1 and 3; (i.e. when the device is resting on the ground) the axis of rotation of each fan is substantially vertical. The ends of the ducts 9,10 are depicted as open, but may in fact be covered by a protective grill or mesh.

The engine 6 needs to be compact, lightweight, and powerful (typically 200 hp). It also is important that as much of the engine power as possible is transmitted to the fans 7,8 (see below) and it therefore is advantageous if the radiator 30 for cooling the engine does not require a separate fan for this purpose, since this wastes the available power.

To provide very efficient engine cooling without the need for a separately driven fan, the radiator 30 is cooled by a forced airflow provided by a pair of passages 31,32, as shown in FIG. 1. The radiator 30 is located between the ducts 9,10, just below the upper edges of the ducts and with the plane of the radiator substantially perpendicular to the longitudinal axes of the ducts. The radiator 30 is connected to the motor by piping in the usual manner; the piping is omitted from the drawings for clarity.

Figure 11:
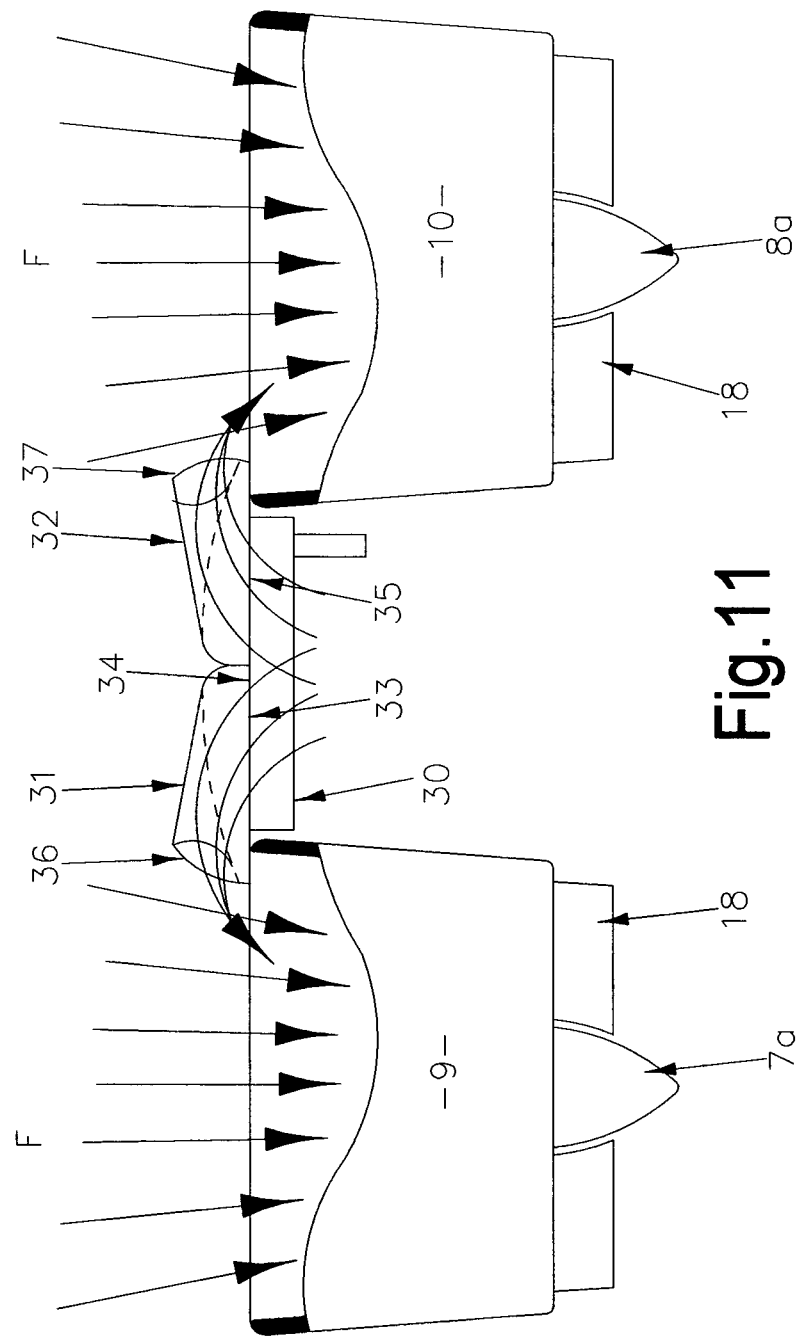
FIG. 11 is a diagrammatic side view of the ducts, radiator and air passages, with the ducts cut away.
Figure 12:
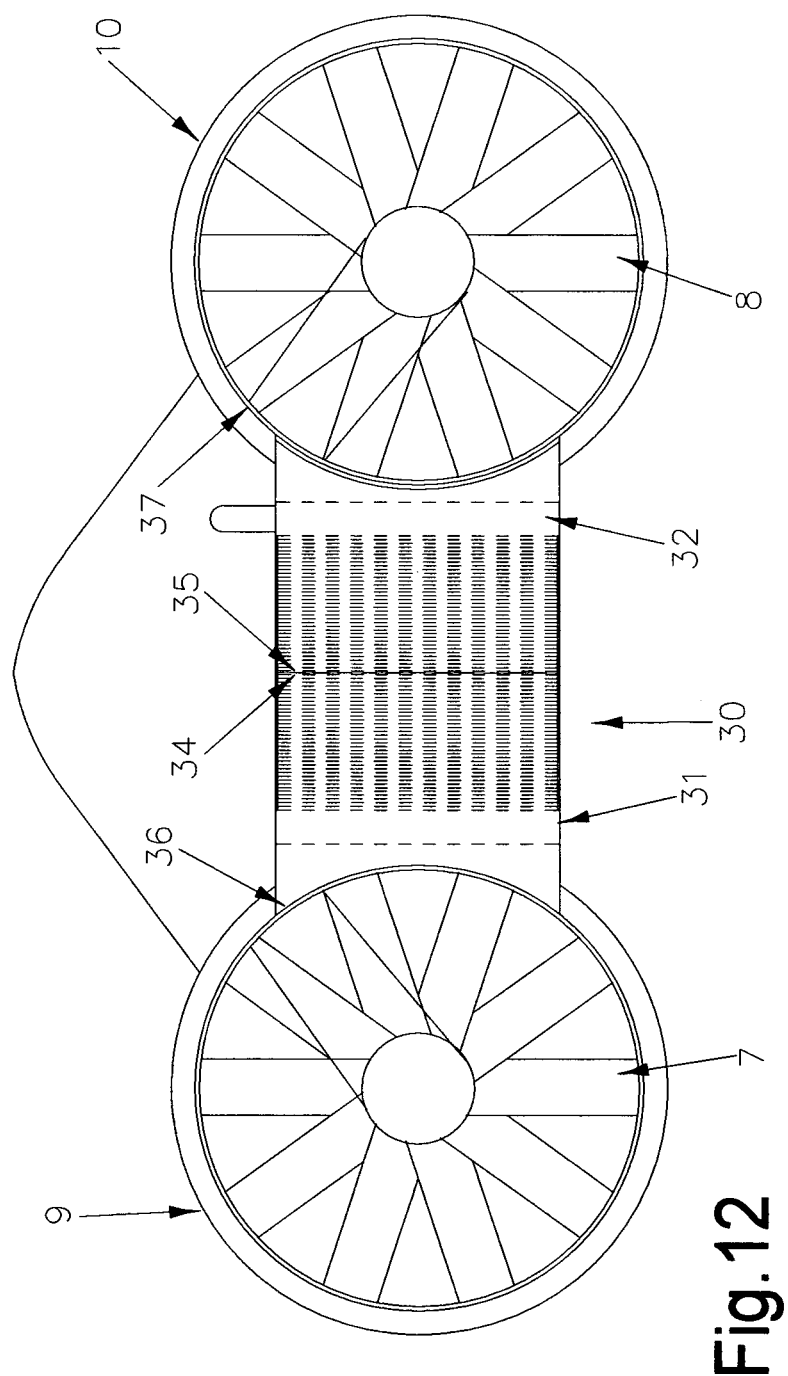
FIG. 12 is a plan view of the radiator, passages and ducts.

The passages 31,32, are shown in greater detail in FIGS. 11 and 12:—the entry end 33 of the passage opens onto the upper surface 34 of the radiator, and is dimensioned so that the end 33 covers the adjacent half of the upper surface 34 of the radiator. The entry end 35 of the other passage 32 covers the other half of the upper surface 34 of the radiator. Each passage 31,32 has a constant cross-sectional area for the majority of its length, but flares out to a larger cross-sectional area at the exit end 36,37 respectively, with the lower rim of each exit end lying around part of the upper edge of the corresponding duct 9,10.

When the fans 7,8 rotate in the corresponding ducts 9,10 in use, the direction of airflow through the ducts is shown by the arrows F in FIG. 11. The effect of the high-speed flow of air through the ducts 9,10 is to create a comparatively low pressure area around the upper end of each duct, adjacent the exit ends 36,37 of the passages 31,32. These low-pressure areas draw air through the passages 31,32 and hence draw air through the radiator 30. Air can flow from the back, front and sides of the device to the underside of the radiator, and as long as the fans 7,8 are rotating in the ducts 9,10, air is sucked through the radiator and through the passages 31,32, providing very efficient cooling of the radiator.

The rate of flow of air through the radiator obviously depends upon a large number of factors, including the fan and duct diameter, the speed of the fans, the area of the radiator and the area of the passages. A further factor is the ratio of the area of the entry end of each passage to the area of the exit end of each passage:—for example, a ratio of the radiator exit area to the radiator inlet area of 2:1 creates a high flow rate of air through the radiator at low engine speed; a smaller ratio creates a different flow vs RPM curve.

Rather than providing a pair of passages 31,32, it would be possible to substitute either more than two passages or use only a single passage; the principle would remain the same.

Figure 4:
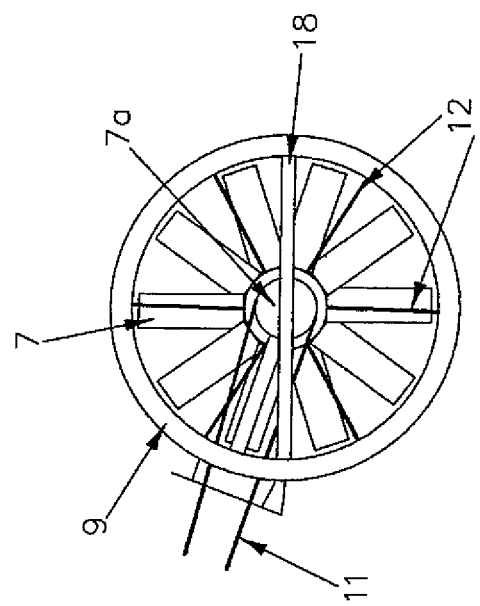
FIG. 4 is a view of one ducted fan from below, with the air passage omitted.
Figure 6:
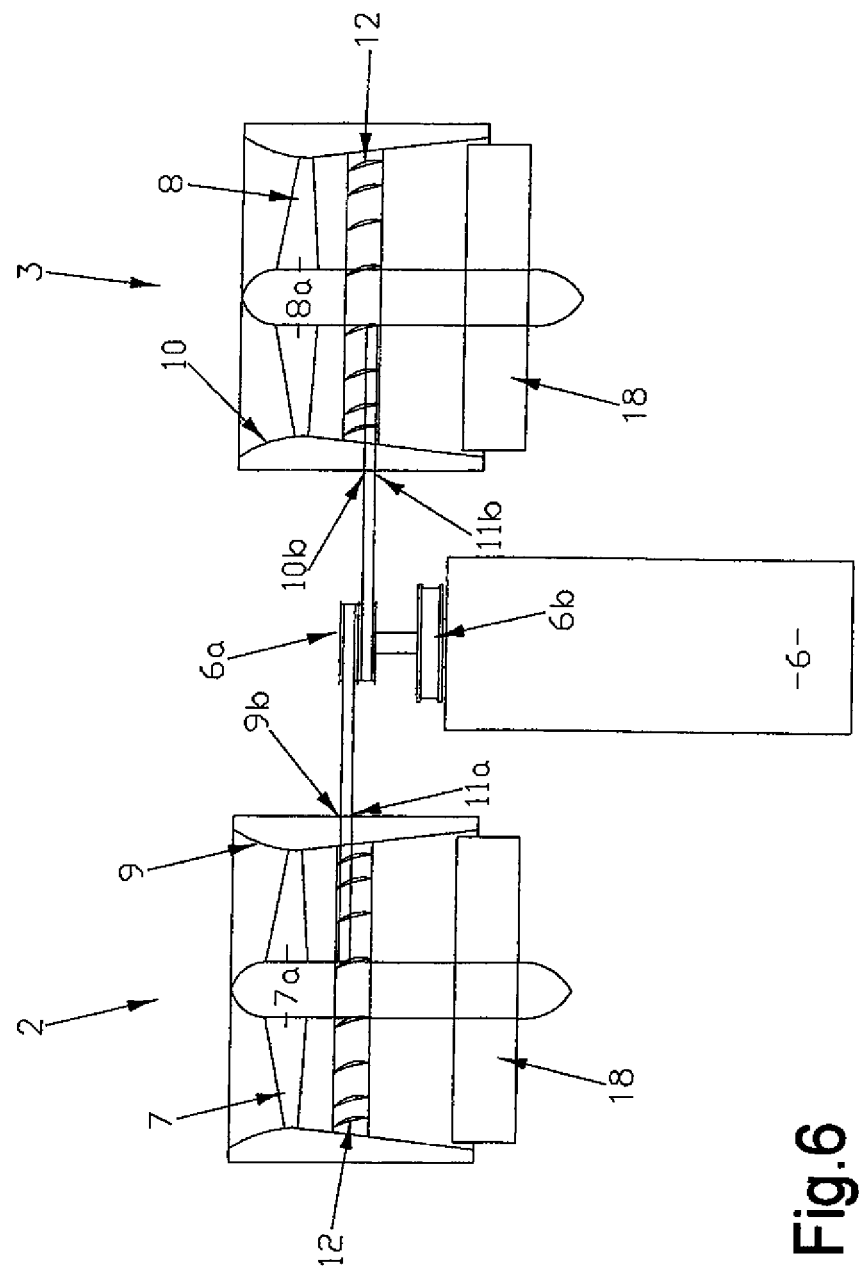
FIG. 6 is a diagram of the drive arrangement.

The fans 7,8 are driven from the engine 6 by a drive means in the form of a pair of toothed drive belts 11a,11b to the corresponding hub 7a,8a. The toothed belt drive is shown (diagrammatically) in FIGS. 4 and 6. As shown in FIG. 6, the engine 6 drives a drive pulley 6a through a flexible coupling 6b, to dampen torsional vibration from the engine 6. Two drive belts 11a,11b are engaged with the drive pulley 6a, one belt alongside the other.

The first drive belt 11a passes around the pulley 6a, through an aperture 9b in the duct 9 and around the hub 7a to drive the fan 7. The second drive belt 11b passes around the pulley 6a, through an aperture 10b in the duct 10, and around the hub 8a to drive the fan 8. In use, both fans 7,8 are rotated in the same direction, but the airflow from the bottom 9a,10a, of each duct 9,10 is made linear (i.e. substantially parallel to the longitudinal axis of the corresponding fan) by the use of a row of stators 12. The stators 12 are spaced, and extend radially around the inner circumference of each duct 9,10 below the corresponding fan 7,8. Each stator 12 is a 'spoke' which extends radially from the inner wall of the duct towards the hub.

FIG. 8a shows the simplest arrangement of stators, in which each stator is a flat parallel-sided plate, with the length of each plate extending radially from the inner wall of the duct towards the hub.

Figure 9:
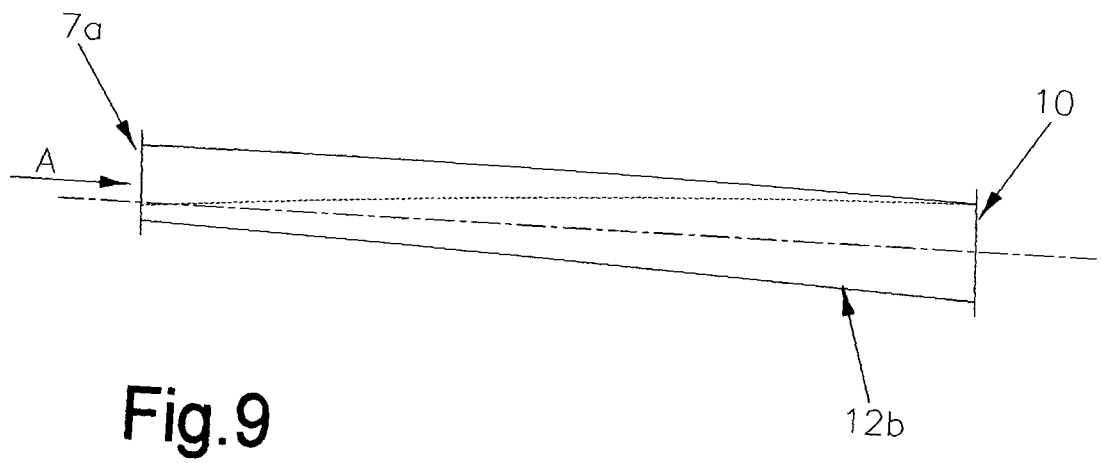
FIG. 9 is a plan view of a stator of FIG. 8b on a larger scale.
Figure 10:
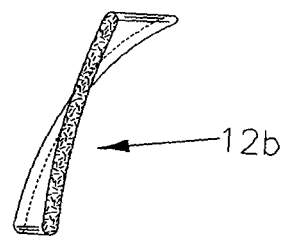
FIG. 10 is a view in the direction of Arrow A of FIG. 9.

FIGS. 8b,9 and 10 illustrate a more aerodynamically efficient design of stator 12b, in which each stator 12b is a curved aerofoil cross-section plate, one end of which is secured to the inner wall of the duct and the other end of which is secured to the hub. As shown in FIGS. 9 and 10, each stator 12b twists along its longitudinal axis from the hub to the duct. Stators of this design have a higher efficiency than the simple flat stators 12a, but are more expensive to produce and to fit.

The housing 4 is slightly wider than the shoulder width of the pilot, and approximately the same height as the pilot. In the "at rest" position shown in FIGS. 1 and 3 of the drawings, the device is supported by a stand 1a, which is shown diagrammatically and may be of any suitable type.

Figure 2:
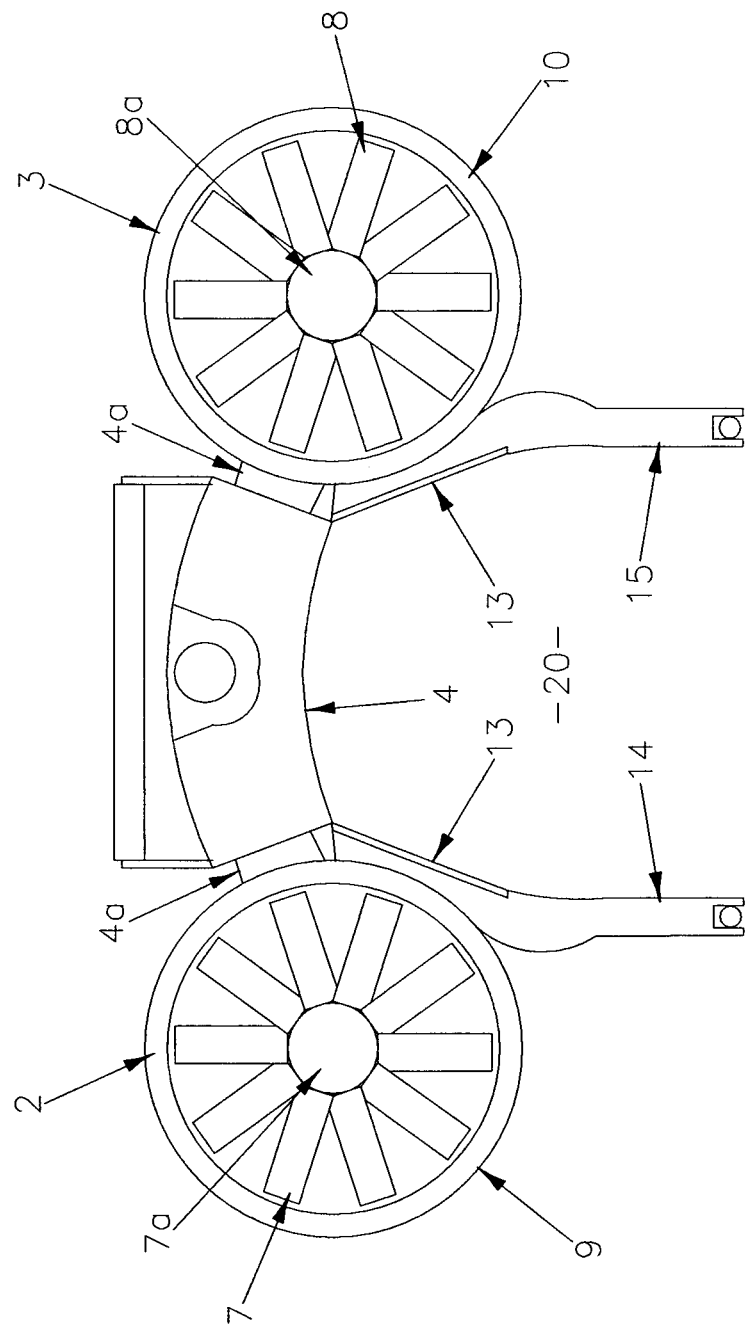
FIG. 2 is a plan view from above of the device of FIG. 1, but with the radiator and air passages omitted, for clarity.
Figure 3:
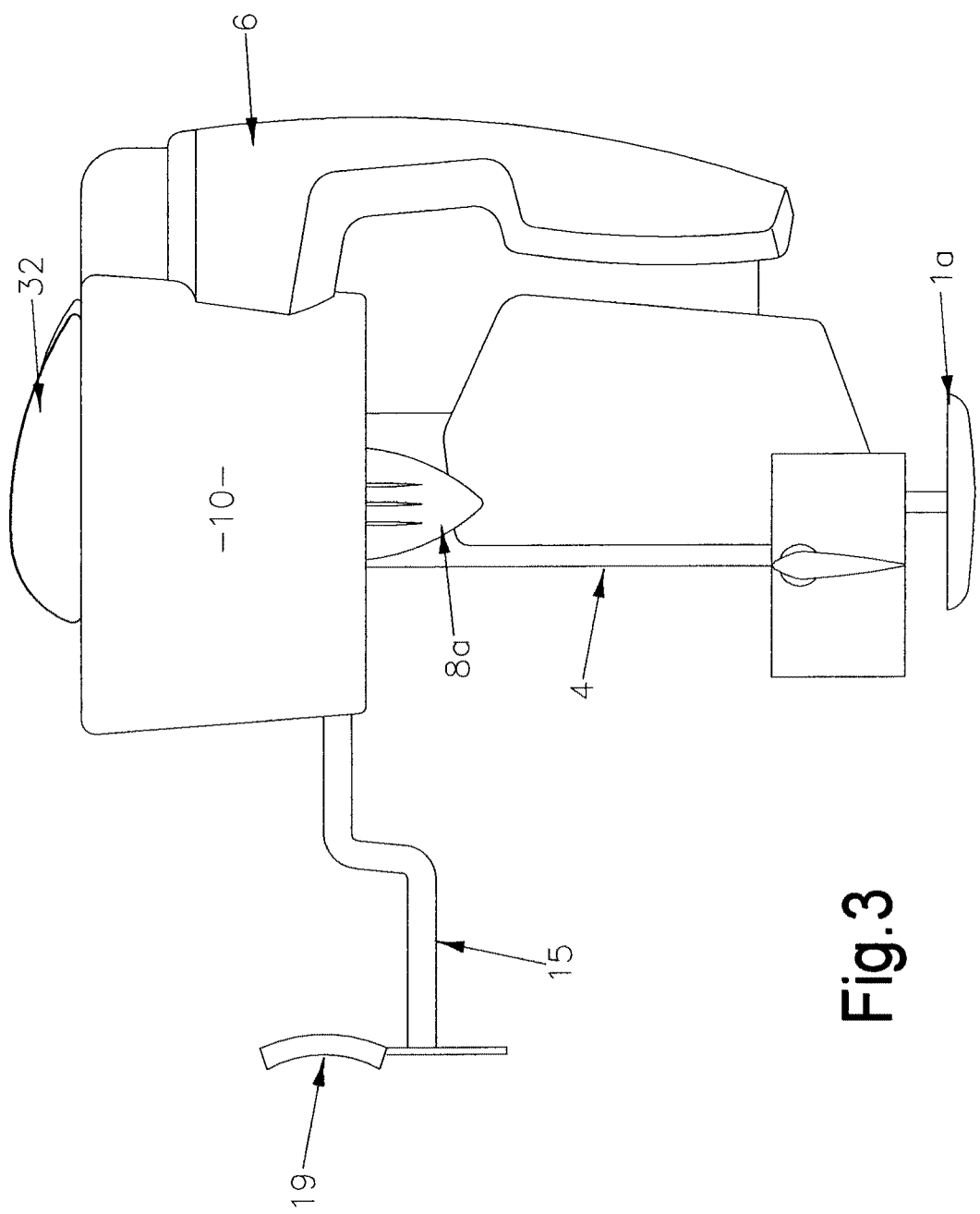
FIG. 3 is a side view of the device of FIG. 1.

The housing 4 provides head shields 13 and armrests 14,15 (FIGS. 1 and 2). The armrest 14 incorporates a twist grip throttle and a control lever 17. The twist grip throttle is connected to the engine 6 and is used to control the acceleration of the engine in known manner. The control lever 17 is connected to the control vane 18 for the fan 2. As shown in greater detail in FIG. 7, the lever 17 is pivoted to the outer end of the arm rest 14, and the end of the lever 17 below the arm rest 14 is connected to one end of a rod (not shown), the other end of which is connected adjacent the lower end of the control vane 18. The control lever 19 is connected to the arm rest 15 and the control vane for the fan 3 in the same manner.

The control arrangement for the control vanes is a simple lever control:—in the case of fan 2, movement of the control lever 17 in the direction of arrow X moves the control vane in the direction of arrow B, and movement of the lever 17 in the direction of arrow Y moves the control vane in the direction of arrow A. Alternatively, a cable could be used in place of each rod. Another possibility is to use a non-mechanical control system, by substituting an electric actuator for controlling each control vane.

Figure 5:
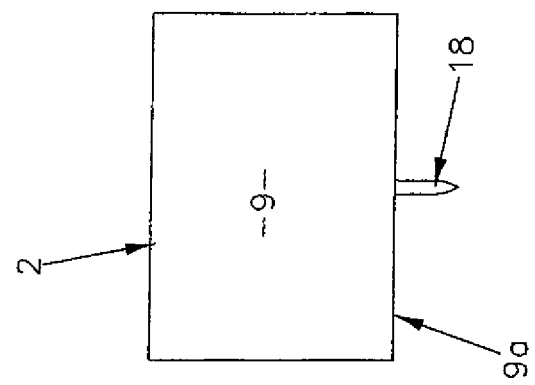
FIG. 5 is a side view of the fan of FIG. 4, with the air passage omitted.

Each control vane is mounted diametrically across the lower edge 9a,10a, of the corresponding duct 9,10 and is arranged to pivot about an axis substantially perpendicular to the axis of rotation of the corresponding fan and hub. Each vane has an aerofoil cross section. Each vane projects partly below the lower edge of the corresponding duct, as shown in FIG. 5.

In use, the pilot stands in the space 20 (FIGS. 1 and 2) and is strapped to the device by means of a parachute type harness (not shown) which is mounted on the housing 4. Once strapped in, the pilot starts the engine 6 to rotate the fans 7,8 within the ducts 9,10 to give vertical lift to the device. The amount of lift is governed by the acceleration of the engine 6, which is controlled by the throttle 16. Forward movement is given by angling the control vanes of the fans 2,3 using the control levers 17,19. The control vanes also are used to turn the device left or right.

Rotating both fans 7,8 in the same direction means that the fans can be driven directly from the engine and there is no need for a gearbox to alter the direction of, drive. This saves a great deal of additional weight, and also eliminates a component which would need maintenance and be a possible source of failure. Rotating both fans in the same direction would impart torque to the device and make it difficult or impossible to steer, were it not for the stators which render the airflow leaving the fans 2,3 substantially linear.

The device is fitted with a parachute (not shown) which in emergencies can be opened by the pilot to bring the device and the pilot together safely to the ground.

It is envisaged that the primary use of the above-described device would be a one-person transport. However, it would be possible to substitute any of a range of remote-control devices for the pilot, and to operate the device remotely.

The invention claimed is:

1. A personal flight device which includes:
a housing which is securable to a pilot;
at least one pair of ducted fans, one fan of of said at least one pair of ducted fans mounted to one side of the housing, the other fan of of said at least one pair of ducted fans mounted to the other side of the housing;
wherein each fan rotates about an axis of rotation so as to draw air through the corresponding duct from an entry end of the duct to an exit end of the duct;
and wherein the axis of rotation of each fan is fixed relative to the housing;
at least one engine mounted on the housing for driving the fans such that each pair of fans of said at least one pair of ducted fans rotate in the same direction for producing thrust;
at least one radiator;
each engine of said at least one engine being cooled by a radiator of said at least one radiator;
each radiator of said at least one radiator being associated with at least one passage having an entry end in communication with one surface of the radiator and an exit end adjacent the entry end of one duct of said ducted fans.

2. The personal flight device as claimed in claim 1, wherein the device includes only a single pair of ducted fans and a single engine.

3. The personal flight device as claimed in claim 2, wherein said at least one passage associated with the radiator includes first and second passages; the first passage having an entry end in communication with approximately one half of one surface of the radiator and an exit end adjacent the entry end of one of said ducts; the second passage having an entry end in communication with approximately the other half of said one surface of the radiator and an exit end adjacent the entry end of the other of said ducts.

4. The personal flight device as claimed in claim 3, wherein the plane of the or each radiator is substantially perpendicular to the longitudinal axes of the ducts.

5. The personal flight device as claimed in claim 3, wherein each passage of said at least one passage has a constant cross-sectional area for a major portion of a length of said passage but widens to a larger cross-sectional area at the exit end.

6. The personal flight device as claimed in claim 1, wherein the plane of the or each radiator is substantially perpendicular to the longitudinal axes of the ducts.

7. The personal flight device as claimed in claim 1, wherein each passage of said at least one passage has a constant cross-sectional area for a major portion of a length of said passage but widens to a larger cross-sectional area at the exit end.

8. The personal flight device as claimed in claim 7 or claim 5, wherein the cross-sectional area of the exit end of each passage of said at least one passage is approximately twice the cross-sectional area of the entry end of the or each passage.

9. The personal flight device as claimed in claim 1, wherein each fan is secured to the housing such that the axis of rotation of each fan is substantially vertical when the device is secured to a pilot standing upright.

10. The personal flight device as claimed in claim 1, further including a steering vane coupled to at least one fan of the at least one pair of ducted fans, said vane being controllable for directing the airflow leaving the at least one fan.

11. The personal flight device as claimed in claim 1, wherein each engine of said at least one engine is selected from the group consisting of two-stroke internal combustion engines, four-stroke internal combustion engines, rotary engines, and gas turbine engines.

12. The personal flight device as claimed in claim 1, further including a drive means driven by the at least one engine, said driven drive means driving the at least one pair of fans.

13. The personal flight device as claimed in claim 12, wherein the drive means is a single drive.

14. The personal flight device as claimed in claim 12, wherein the drive means is a double drive.

15. The personal flight device as claimed in claim 12, wherein the drive means is a drive selected from the group consisting of chain drives, fluid drives, and belt drives.

16. The personal flight device as claimed in claim 1, wherein the device includes a set of stators arranged in each fan duct to straighten the airflow leaving that fan.

\* \* \* \* \*

UNITED STATES PATENT AND TRADEMARK OFFICE
CERTIFICATE OF CORRECTION

PATENT NO. : 8,608,103 B2
APPLICATION NO. : 13/001254
DATED : December 17, 2013
INVENTOR(S) : Glenn Neil Martin et al.

Page 1 of 1

It is certified that error appears in the above-identified patent and that said Letters Patent is hereby corrected as shown below:

In the Claims

| | |
|---|---|
| Column 5, Claim 1, line 44 | Delete "fan of of said" Insert -- fan of said -- |
| Column 5, Claim 1, line 46 | Delete "fan of of said" Insert -- fan of said -- |
| Column 6, Claim 4, line 17 | Delete "the or" |
| Column 6, Claim 6, line 25 | Delete "the or" |
| Column 6, Claim 8, line 35 | Delete "the or" |

Signed and Sealed this
Ninth Day of December, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,608,103 B2  Page 1 of 1
APPLICATION NO. : 13/001254
DATED : December 17, 2013
INVENTOR(S) : Martin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 407 days.

Signed and Sealed this
Twenty-second Day of September, 2015

Michelle K. Lee
*Director of the United States Patent and Trademark Office*